(12) United States Patent
Sedighy

(10) Patent No.: US 7,295,593 B2
(45) Date of Patent: Nov. 13, 2007

(54) SYSTEM AND METHOD OF MINIMIZING LOSS OF ELECTRICAL CONDUCTION DURING INPUT OF FEED MATERIAL TO A FURNACE

(75) Inventor: Mohammad Sedighy, Ontario (CA)

(73) Assignee: Hatch Ltd., Mississauga (CA)

( * ) Notice: Subject to any disclaimer, the term of this patent is extended or adjusted under 35 U.S.C. 154(b) by 0 days.

(21) Appl. No.: 11/213,950

(22) Filed: Aug. 30, 2005

(65) Prior Publication Data
US 2006/0050759 A1    Mar. 9, 2006

Related U.S. Application Data

(60) Provisional application No. 60/606,342, filed on Sep. 1, 2004.

(51) Int. Cl.
H05B 7/144 (2006.01)
(52) U.S. Cl. .................. 373/102; 373/104; 373/108
(58) Field of Classification Search ............... 373/102, 373/103, 104, 105, 106, 107, 108
See application file for complete search history.

(56) References Cited

U.S. PATENT DOCUMENTS

| | | | |
|---|---|---|---|
| 4,607,374 A * | 8/1986 | Inagaki et al. | 373/104 |
| 5,115,447 A * | 5/1992 | Bowman | 373/102 |
| 5,155,740 A * | 10/1992 | Ao et al. | 373/108 |
| 5,991,327 A | 11/1999 | Kojori | |
| 6,274,851 B1 | 8/2001 | Mulcahy et al. | |
| 6,573,691 B2 | 6/2003 | Ma et al. | |
| 6,603,795 B2 | 8/2003 | Ma et al. | |

OTHER PUBLICATIONS

T.L. Ma et al., The SPLC A New Technology for Arc Stabilization and Flicker Reduction on Electric Arc Furnaces, 1999 Electric Furnace Conference Proceedings, pp. 553-?.
S. B. Dewan et al., Application of 46kV, 100MVA Smart Predictive Line Controller (SPLC) to AC Electric Arc Furnaces, Power Engineering Society 1999 Winter Meeting, IEEE, vol. 2, Jan. 31-Feb. 1, 1999, pp. 1214-1218.
Mulcahy et al., A New Technology for Control of AC Arc Furnaces, Electric Furnace Conference Proceedings, vol. 35-1995, pp. 307-311.
T.L. Ma et al., Power System Design for High-Power Electric Smelting and Melting Furnaces, The Proceedings of the International Symposium on Non- Ferrous Pyrometallurgy: Trace Matals, Furnace Practices and Energy Efficiency, 31st Conference of Metallurgists of the Metallurgical Society of CIM, Edmonton, AB, Canada, 1992, pp. 337-351.

* cited by examiner

*Primary Examiner*—Quang Van
(74) *Attorney, Agent, or Firm*—Bereskin & Parr; Sylvan S. Browne

(57) ABSTRACT

The described methods and systems may be applied to electric arc furnace installations. In this context, the method and system provide an electrode position controller coupled to the feed rate controller so as to predictively anticipate the introduction of new source material and lower the electrodes so as to prevent arc extinguishment while variable reactors are controlled to maintain predetermined power set-points. The electrode position controller may be used in place of, or in addition to, the variable reactance control system to take corrective action to address power and/or current changes or unbalances.

29 Claims, 9 Drawing Sheets

SYSTEM AND METHOD OF MINIMIZING LOSS OF ELECTRICAL CONDUCTION DURING INPUT OF FEED MATERIAL TO A FURNACE

CROSS REFERENCE TO RELATED APPLICATIONS

This application claims the benefit of U.S. Provisional Patent Application Ser. No. 60/606,342, filed Sep. 1, 2004 and entitled "Power Control System for Multiple Electrical Loads", the entire contents of which is hereby incorporated by reference.

FIELD OF THE INVENTION

The present invention relates generally to systems and methods for minimizing loss of electrical conduction during input of feed material to a furnace.

BACKGROUND OF THE INVENTION

There are a number of contexts in which power and/or current stabilization and unbalance compensation are desirable to mitigate the inefficiencies and potential damage that can result from fluctuating energy demands. For example, in the case of alternating current (AC) electric arc furnaces, high power arcs are used to melt or smelt ore, metals and/or other materials, and these high power arcs behave as non-linear time varying impedances. The active or reactive power consumed by an electric arc furnace tends to fluctuate due to frequently changing operating conditions, causing frequency and/or voltage disturbances which may negatively impact the power supply and other loads connected to the same power supply.

In addition, electric arc furnaces tend to be connected as three-phase loads and may draw unbalanced currents from the power supply, which can lead to voltage imbalances. The resulting current imbalance may exceed the unbalanced current capacity of the supply system.

Loss of arc between the electrode and the furnace bath causes severe fluctuations in power and current drawn by the furnace from the power supply. Such loss of arc may result from, for example, the sudden input of new feed material into the furnace. In the case of smelting furnaces, new feed material is frequently added to the furnace while the furnace is in operation and is typically deposited around the area where electrodes are arcing. The new feed material typically has a relatively high electrical resistance, and the material cannot always be distributed evenly. Unevenly distributed feed material can push high resistance material under one or more electrodes, causing the resistance of the arcing path to be increased significantly, which may lead to extinguishment of the arc.

Arc losses cause furnace power and current drops. In a 3-phase, 3-electrode arc furnace, for example, a loss of arc under one electrode causes a 50% drop in furnace power. As a result, the furnace operator or the automatic electrode regulation system may have to lower one or more of the electrodes to establish contact with low resistance material in the furnace and slowly raise the electrodes in order to return the electrodes to their normal operating positions.

Arc losses usually do not occur under all electrodes at the same time. As a result of an arc loss, furnace currents may become severely unbalanced. This unbalance affects operation of the power generator and other loads coupled to the generator. In some circumstances, the power and current disturbances resulting from arc loss may lead to shutdown of power to the furnace, and possibly even shutdown of the generator. If the furnace or generator is shut down, there may be significant delays before it can be restarted, resulting in reduced operating efficiency and substantial economic loss.

It is desired to address or ameliorate one or more of the problems described above, or to at least provide a useful alternative to previous systems or methods.

SUMMARY OF THE INVENTION

Aspects of the invention relate generally to methods and systems for minimizing loss of electrical conduction in an electric furnace during input of feed material to the furnace, and to electric furnaces employing such systems and methods. In order to avoid arc loss or other conduction loss, or at least reduce the likelihood thereof, at least one electrode in the furnace is lowered in anticipation of the input of the feed material. The reduced likelihood of conduction loss contributes to increased furnace efficiency and a reduced likelihood of the furnace, or a power generator supplying power to the furnace, needing to be shut down.

In one aspect, the invention relates to an electric furnace system coupled to a power supply. The furnace system includes an electrode, a variable reactor control system for maintaining a power set-point, including a variable reactor coupled between the electrode and the supply power line, and a feed control system for controlling the input of new materials to the furnace, the feed control system having an output for a feed request signal. The furnace system also includes an electrode positioning system coupled to the electrode for controlling a position of the electrode, the electrode positioning system having an input for receiving the feed request signal and having an override component for lowering the electrode in response to the feed request signal.

In a further aspect, the invention relates to a method for controlling an electric furnace during input of feed material to the furnace. The furnace comprises at least one electrode positionable by an electrode positioning system and a feed control system for controlling the input of feed material to the furnace, the feed control system having an output for a feed request signal. The method comprises steps of receiving at the electrode positioning system the feed request signal from the feed control system and lowering the electrode in response to the feed request signal.

In another aspect, the invention relates to a system for minimizing loss of electrical conduction during input of feed material to an electric furnace, the system comprising at least one electrode disposed within the furnace. A power supply is coupled to the at least one electrode so that each electrode is coupled to a respective phase of the power supply. A feed control system controls the input of feed material to the furnace and has an output for a feed request signal. An electrode positioning system is coupled to each electrode for controlling a position of the electrode within the furnace, the electrode positioning system having an input for receiving the feed request signal and having positioning means for causing at least one electrode to be lowered in response to the feed request signal.

For an arc furnace, the invention reduces the likelihood of arc loss between an electrode and the feed material during entry of new feed material into the furnace by lowering the electrode in anticipation of the input of the feed material. In some embodiments, a variable reactor is provided between the electrode and the power supply to assist in maintaining a set-point, such as a power or current set-point, during the lowering and subsequent raising of the electrode. Use of the variable reactor in this context advantageously enables greater current and power stability to be achieved during repositioning of the electrode.

The reduced likelihood of arc loss resulting from embodiments of the invention contributes to greater overall current balance and power stability, as well as overall furnace operating stability, and thereby increases the energy efficiency of the furnace and reduces the likelihood of the furnace or power generator needing to be shut down.

BRIEF DESCRIPTION OF THE DRAWINGS

Reference will now be made, by way of example, to the accompanying drawings, which show embodiments of the present invention, and in which.

DESCRIPTION OF SPECIFIC EMBODIMENTS

While the embodiments described herein generally relate to three-phase, three-wire electric arc furnaces with one electrode per phase, it should be understood that the invention is applicable to furnaces having only one electrode, whether arcing or non-arcing and whether DC or AC, or other numbers of electrodes. In particular, the invention may be applied to furnaces having two electrodes per phase of a multi-phase power supply. For example, the invention may be applied to a three-phase furnace having six electrodes.

It should be understood that for every kind of electrical furnace configuration, it is necessary to provide a return path for the current passing through the electrode. This may be through the conductors of the three-phase power supply or it may be through a dedicated conductor separate to the supply conductors. In the case of a one electrode furnace, the return path of the current may be through a fixed conductive medium in electrical contact with the matte or molten metal.

A method and system for stabilizing power in an electric arc furnace is described in detail in U.S. Pat. No. 6,603,795 to Ma et al., the contents of which are hereby incorporated by reference.

Ma et al. describe a power control system that varies the reactive impedance between the electrodes of an electric arc furnace and the power supply line in response to measured characteristics of the furnace. In particular, the described system monitors the voltage and current drawn by an electrode in the electrode arc furnace and determines the electrode impedance. Based upon the electrode impedance, the power control system adjusts the reactive impedance to minimize power fluctuations seen by the power supply network. It does this by adjusting a variable reactance. The response time associated with this control system is on the order of about one electrical cycle, providing for a relatively fast response.

Ma et al. also describe an electrode position controller that controls an electrode positioning system to adjust the electrode height based upon measured characteristics of the electrode. For example, the electrode position controller may monitor the electrode impedance by monitoring the voltage and current characteristics for the furnace and may regulate the electrode height to minimize power fluctuations due to changes in the electrode impedance. The response time of this control system is relatively slow, being in the order of several seconds.

Figure 1:
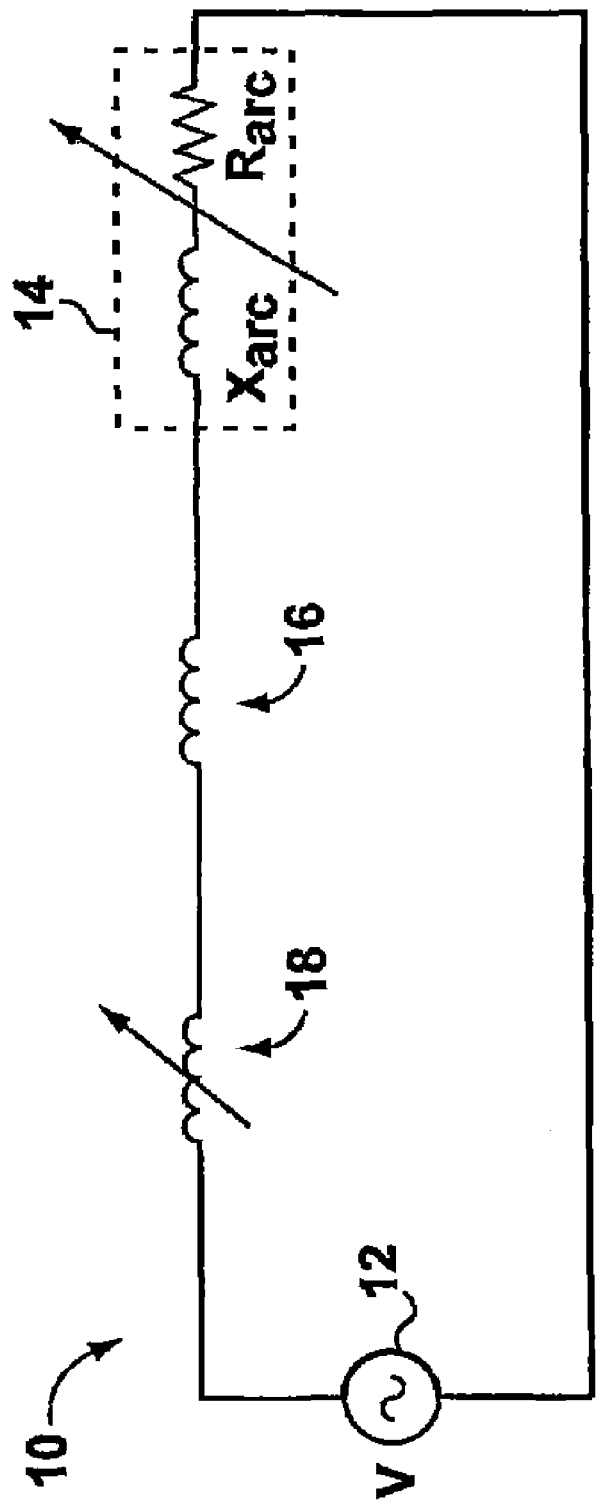
FIG. 1 shows a per-phase diagram of a simplified circuit of an electric arc furnace.

Reference is first made to FIG. 1, which shows a diagram of simplified circuit 10 of an electric arc furnace in accordance with Ma et al. The circuit 10 shows a line voltage 12, an arc impedance 14, a fixed circuit reactance 16, and a variable reactance 18. The arc impedance 14 includes an arc reactance $X_{arc}$ and an arc resistance $R_{arc}$. The fixed circuit reactance 16 may include reactance of the furnace transformer and any power cables, conductors, and bus work between the supply system and the electrode, where that reactance can be considered constant as compared to the arc impedance 14.

If the total circuit resistance of circuit 10 is given by the variable R and the current is given by the variable 1, then the active power P consumed by the circuit 10 is governed by the equation $P=RI^2$. The arc impedance 14 is variable and may change abruptly, which may cause changes in the current I. In particular, the current I may be interrupted if the arc is extinguished.

In order to maintain the power P at a power set-point, the variable reactance 18 is adjusted to compensate for changes to the total circuit resistance R and the current I. It will be understood that if the electrode current I drops below a value $I_{critical}$ then the circuit 10 will be unable to maintain the power P at a fixed level and the power P will drop below the power set-point. This value $I_{critical}$ coincides with the variable reactance 18 being reduced to its minimum value.

There may be a maximum variable reactance setting that would limit the ability of the circuit 10 to maintain the power P at the set-point if the current rises above an $I_{max}$ value.

Sudden drops in the electrode current may be encountered with AC electrode arc furnaces when new feed material is introduced to the furnace. If the new material interrupts the arc path it can temporarily cause a large increase in the electrode impedance and a large drop in the electrode current I.

Figure 2:
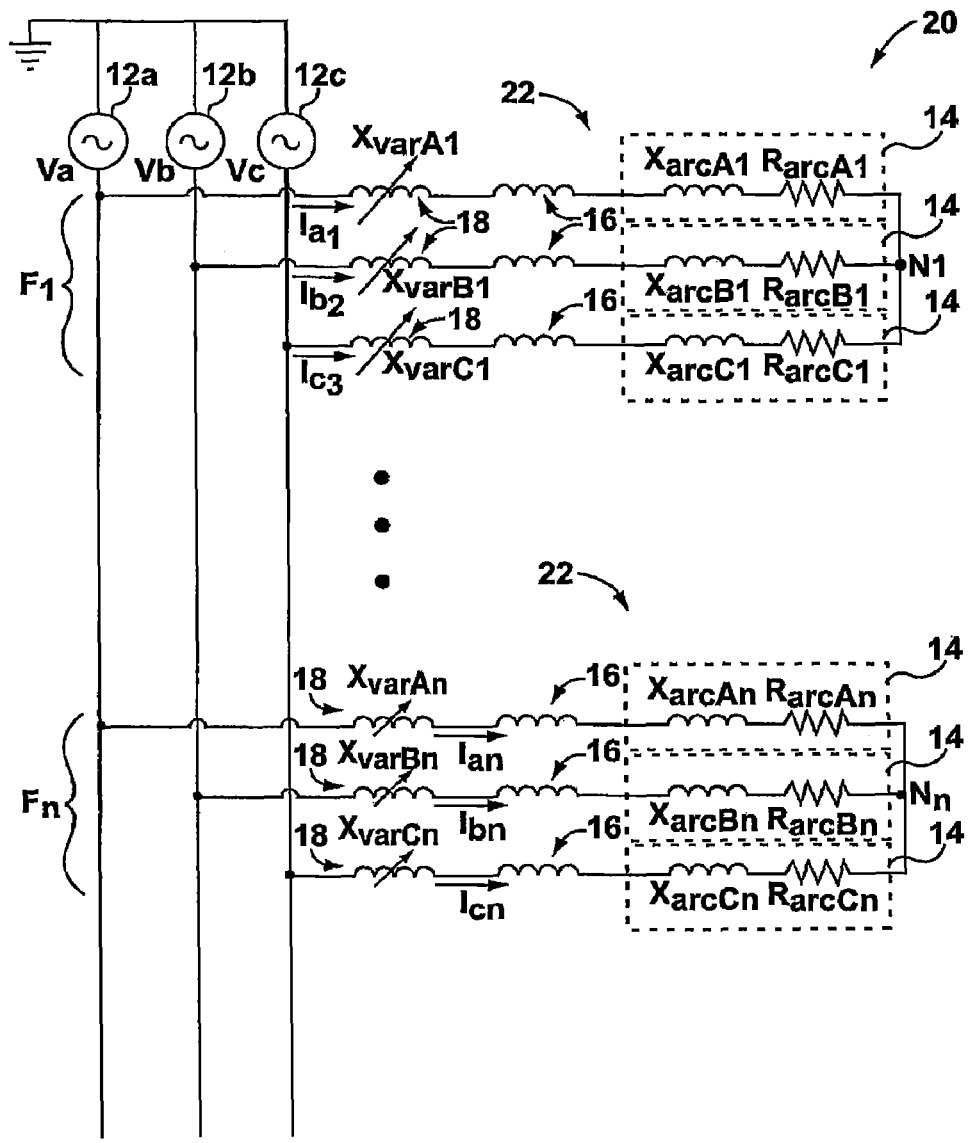
FIG. 2 shows a diagram of a simplified circuit of multiple electric arc furnaces supplied by a 3-phase 3-wire power system.

This difficulty in maintaining the power set-point also arises in the context of three-phase loads, as will be explained with reference to FIG. 2, which shows a simplified circuit 20 for multiple electric arc furnaces 22 (having respective power supply circuits $F_1, F_2, \ldots, F_n$). The line voltage is shown in three phases 12a, 12b, 12c. Each furnace includes three electric arc electrodes, A, B, and C (not shown)—one for each phase.

Each phase of each power supply circuit for the electric arc furnace includes a variable reactance 18 (shown individually as $X_{varA1}, X_{varB1}, X_{varC1}, \ldots$) and a fixed circuit reactance 16. Each phase also includes the arc impedance 14, which is made up of the arc reactance ($X_{arcA1}, X_{arcB1}, X_{arcC1}$) and the arc resistance ($R_{arcA1}, R_{arcB1}, R_{arcC1}$) joined at a common neutral point N. Since, in general, the source voltages, arc impedances 14 and variable reactances 18 are not balanced among phases, the neutral point N is not necessarily at ground potential.

As with the single-phase case, the arc impedance 14 may vary abruptly, such as when the arc path is interrupted. Variations in the arc impedance cause a corresponding change in current I. The variable reactance 18 is adjusted to compensate for the change in current in order to adjust the current and maintain the power set-point. In the three-phase case, the change in current I usually occurs on one of the phases, rather than all three together. Accordingly, this tends to cause unbalance amongst the phases of an arc furnace. Like power fluctuation, current unbalance presents problems for the power generator. In some cases, significant unbalance can cause relays within the power system to trip, triggering an outage.

To an extent, the unbalance within a furnace due to variations in the arc impedance 14 of a phase may be compensated by adjusting the variable reactances 18 for each of the phases. However, there will be a limit to the extent to which this corrective action is effective and this limit corresponds to the adjustable range of the variable reactances 18. Moreover, the goal of maintaining the power set-point may be counter to the goal of maintaining phase balance. For example, fully balancing the phases in the case of extinguishment of one arc may involve reducing the current of the other phases to zero, which would result in an undesirable total power drop to zero.

The above examples outline two goals: the first is to maintain the power set-point for a single multi-phase load; the second is to minimize the phase unbalance for a single multi-phase load. Two additional possible goals or control objectives are, in one embodiment, maintaining the overall power set-point for at least two multi-phase loads drawing power from a common source and minimizing the overall power unbalance for the at least two multi-phase loads. In the case of active power stabilization and unbalance compensation of 3-phase 3-wire loads, these four goals or control objectives may be expressed using the following four formulas:

$$P_{3-\phi} = \text{Re}(\overline{V_a I_a^*}) + \text{Re}(\overline{V_b I_b^*}) + \text{Re}(\overline{V_c I_c^*}) = P_{sp} \quad (1)$$

for each 3-phase load $$|\overline{I_2}| = \text{min value for each multiphase load} \quad (2)$$

$$\sum_{F_1}^{Fn} P_{3-\phi} = \sum_{F_1}^{Fn} [\text{Re}(\overline{V_a I_a^*}) + \text{Re}(\overline{V_b I_b^*}) + \text{Re}(\overline{V_c I_c^*})] = P_{totalsp} \quad (3)$$

$$\left| \sum_{F_1}^{Fn} \overline{I_2} \right| = \text{min value} \quad (4)$$

where $(\overline{I_a}) + (\overline{I_b}) + (\overline{I_c}) = 0$ and $\overline{I_2}$ is the negative sequence current.

The negative sequence current is a measure of current unbalance given by the following decomposition equation:

$$\overline{I_2} = \frac{1}{3}(\overline{I_a} + a^2 \overline{I_b} + a \overline{I_c}) \quad (5)$$

where $a = -0.5 + j0.866$, $I_2$ is the negative sequence current, $I_a$ is the phase A current vector, $I_b$ is the phase B current vector, and $I_c$ is the phase C current vector.

In one embodiment, the present invention applies the above four control objective equations in a priority order as given above—i.e. the first two objectives are to maintain the power set-point for an individual furnace (Equation 1) and to minimize the power unbalance within the individual furnace (Equation 2); and if these two conditions cannot be met by making adjustments to the variable reactances 18 within the individual furnace, then adjustments are made to the variable reactances 18 within other furnaces in order to meet the third and fourth conditions (Equations 3 and 4). The third condition is that, irrespective of whether the individual furnace power set-points $P_{sp}$ are met, the overall summed power should meet the total power set-point $P_{totalsp}$. The fourth condition is that, irrespective of the state of current unbalance $|I_2|$ within an individual furnace, the total overall unbalance for all furnaces combined should be minimized.

The foregoing conditions are not all necessary conditions. Some embodiments may only include some of these conditions. In addition, it will be understood that the conditions may be in a different order of priority. For example, in one embodiment, the goal of minimizing overall unbalance (Equation 4) may take precedence over the goal of maintaining the total power set-point (Equation 3).

Although the foregoing expressions relate to maintaining the real (active) power set-point for each load, they may be applied to maintaining other power set-points. For example, they may be applied to a system for maintaining an imaginary (reactive) power set-point, an apparent power set-point, or a combination of powers like a power factor set-point.

The references herein to power stabilization, power set-points, and power measurements may equally apply to current stabilization, current set-points, and current measurements. In other words, the described embodiments may provide for current stabilization in the same manner that they provide for power stabilization.

The unbalance compensation aspects may, in some embodiments, have a goal or condition of maintaining a predetermined level of unbalance current rather than minimizing or eliminating unbalance current.

In some embodiments, loads associated with different phases may purposely have different power and/or current set-points, meaning that the overall system has a certain controlled level of unbalance. Such unbalance may for example be desirable in a furnace to provide more power and/or current to the electrode nearest the tap hole of the furnace. This facilitates local heating of the bath in the tap hole area and, consequently, local reduction in the bath viscosity and an improved ability to tap the liquid material from the furnace.

Figure 3:
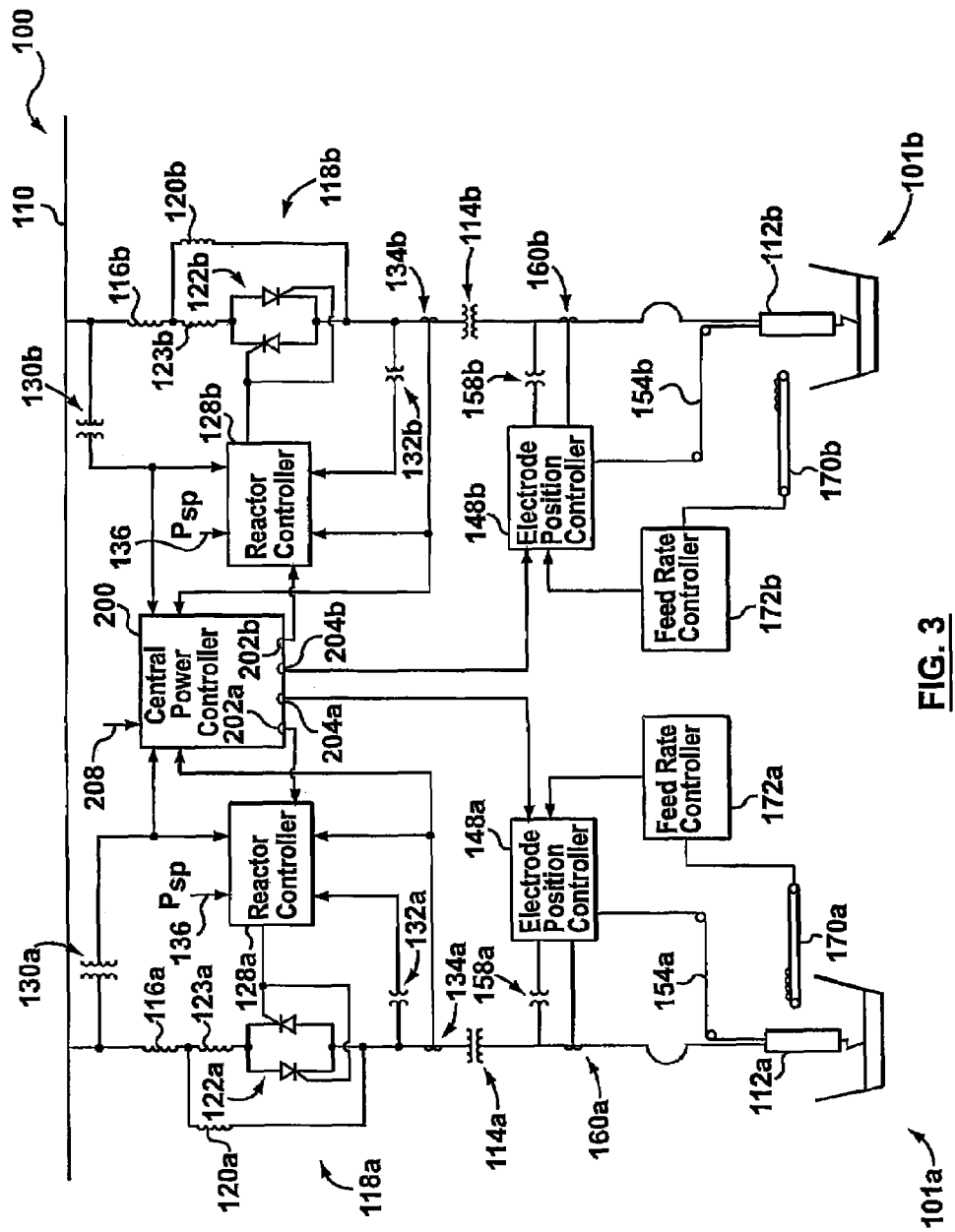
FIG. 3 shows a per phase block diagram of a power control system in accordance with an embodiment of the present invention.

Reference is now made to FIG. 3, which shows a block diagram of a power control system 100 in accordance with one embodiment of the present invention. The power control system 100 includes two furnaces (loads), 101a and 101b. Only a single-phase embodiment is illustrated in the diagram for the sake of simplicity of description; however, those of ordinary skill in the art will appreciate that the functions and operating principles of the single-phase control described and illustrated may be extended to multi-phase systems. Additionally, the power control system may be used to control power to more than two furnaces.

For ease of reference in this description, where a reference is made to parts or functions indicated by reference numerals having both –a and –b suffixes, the suffixes may be omitted. For example, "furnace 101" will be used to indicate a reference to furnaces 101a and 101b, unless otherwise indicated.

Each furnace 101 (each phase in the case of a three-phase embodiment) includes an electrode 112 coupled to the secondary side of a furnace transformer 114. The primary side of the furnace transformer 114 is coupled to a supply bus power source 110 through a fixed circuit reactance 116 and a variable reactor 118.

In one embodiment, the variable reactor 118 includes an inductor 120 connected in parallel with a series combination of an inductor 123 and a thyristor switch 122. Each thyristor switch 122 includes a pair of thyristors arranged in opposite polarity to each other.

Each furnace (or phase) includes a variable reactor control system, which includes a first voltage transformer 130 for measuring the voltage on the supply side of the variable reactor 118, a second transformer 132 for measuring the voltage on the furnace side of the variable reactor 118, a current transformer 134 for measuring the main current flowing to the furnace transformer 114, and a reactor controller 128.

The reactor controller 128 receives information from the first and second voltage transformers 130, 132, the current transformer 134, and a desired power set-point input 136. The reactor controller 128 controls the variable reactor 118 based upon calculations performed using such information.

The reactor controller 128 may comprise a programmable device, such as a digital signal processor, a microcontroller, a microprocessor, a personal computer, or an application specific integrated circuit (ASIC); The reactor controller 128 may operate under stored program control, the stored program control implementing the functions and operations described herein and being stored in memory element, such as firmware. The suitable programming of the reactor controller 128 to implement the functions or operations described herein will be within the understanding of one of ordinary skill in the art. Those of ordinary skill in the art will also appreciate that the reactor controller 128 may be implemented using other combinations of hardware and/or software.

The reactor controller 128 controls the reactance of the variable reactor 118 by adjusting the firing angles of thyristors 122, thereby increasing or decreasing the current through the inductor 123. Based on ongoing current and voltage readings acquired from the first and second voltage transformers 130, 132, and the current transformer 134, the reactor controller 128 gates the thyristors 122 to vary reactance in order to regulate power swings or unbalances in the arc furnace 101 (about the desired power set-point 136) that result from arc impedance fluctuations.

Each furnace 101 (or phase) may further include an electrode position controller 148 that receives inputs from a voltage transformer 158 and a current transformer 160 on the secondary side of the furnace transformer 114. The electrode position controller 148 is operatively coupled to an electrode movement system 154 for adjusting the height of the electrodes 112, and thus, the arc impedance. The electrode position controller 148 may therefore adjust the height of the electrodes 112 in order to compensate for changes in the arc impedance. It will be appreciated that the response time of the electrode positioning system is typically at least one order of magnitude slower than the variable reactance system.

A batch feed system 170 is coupled to each furnace 101 to supply new material to the furnace 101 to counter the removal of processed material from the furnace 101. Each batch feed system 170 is controlled by a feed rate controller 172. The feed rate controller 172 regulates the supply of new material and has an output coupled to the electrode position controller 148 through which it provides the electrode position controller 148 with a data signal corresponding to the feed rate of new material. The electrode position controller 148 uses this data signal to anticipate changes to the arc impedance or to compensate for changes in the arc impedance. For example, in anticipation of the introduction of new material to one of the furnaces 101 a, the electrode position controller 148a may initiate lowering of the electrode 112a.

The reactor controller 128a maintains the furnace power and/or current set-point level, despite the lowering of the electrode 112a and the consequent reduction in the arc impedance, by changing the reactance of the variable reactor 118a and thus preventing the power or current from varying substantially from the set-point.

If the electrode does not have a variable reactor coupled to it for compensating for the reduced impedance during lowering of the electrode, the electrode power and current changes. In such a case, the power and current may both increase or the power may decrease while the current increases. While the furnace will have a reduced likelihood of loss of electrical conduction because of the anticipatory lowering of the electrode prior to entry of the feed material, use of a variable reactor to compensate for impedance variations as described provides improved power and current stability during movement of the electrode.

The anticipating action of the electrode position controller 148 positions the electrodes 112a at such a height as to mitigate against new material entering the furnace breaking the arc path. This height may be, for example, at or slightly above the surface of the slag bath. At the same time, the reactor controller 128 tries to maintain the furnace power or current set-point through adjustments to the variable reactor 118.

Upon completion of the feeding of new material into the furnace, the batch feed system 170 provides a feed end signal to the electrode position controller 148 and the electrode 112 is raised toward its previous position by the electrode position controller 148 and consequent adjustments to the variable reactors 118 are made by the reactor controller 128 to try to maintain the furnace power and/or current set-point during movement of the electrode 112.

Figure 9:
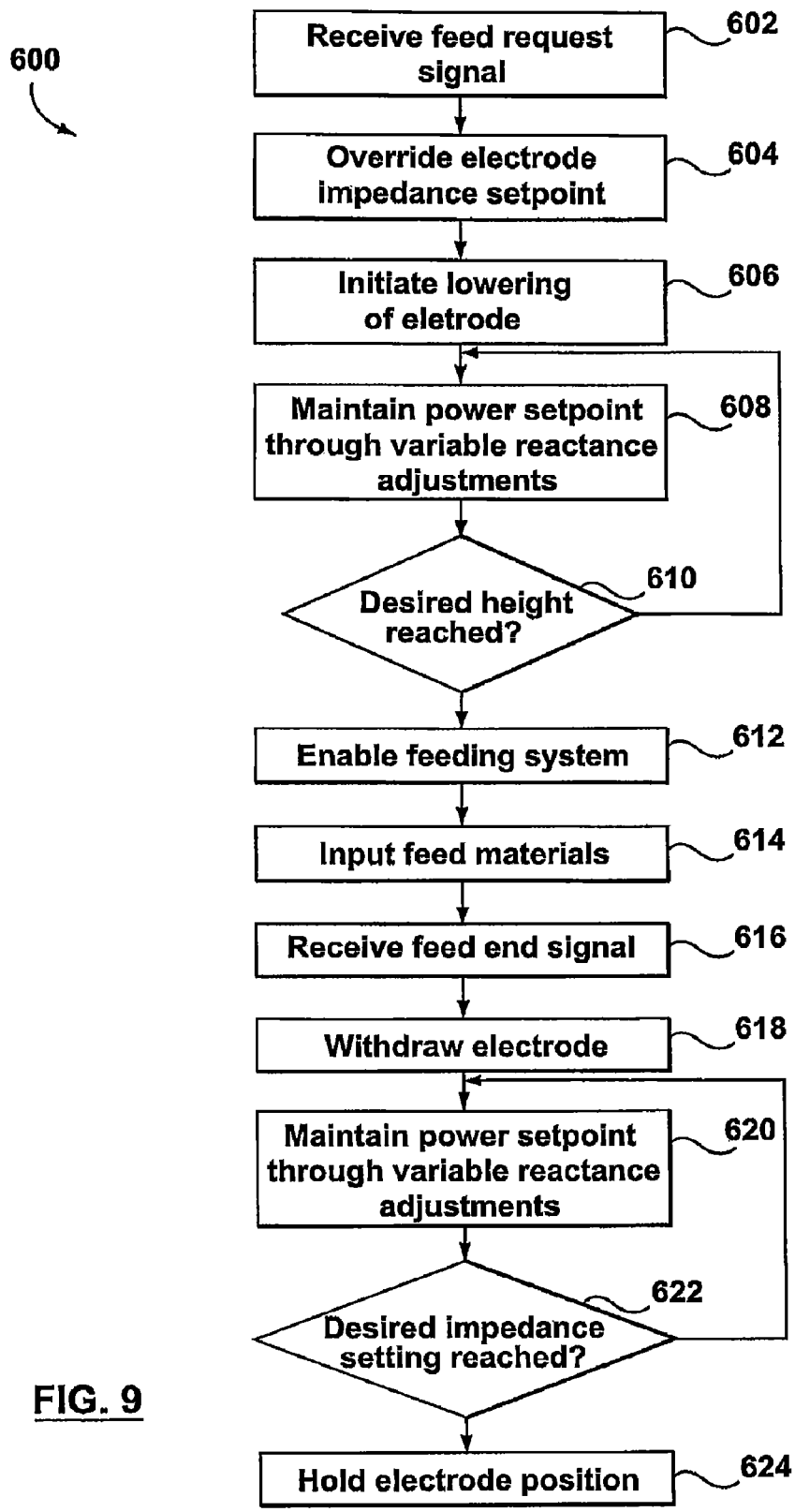
FIG. 9 shows, in flowchart form, a method of regulating electrode position.

Referring also to FIG. 9, there is shown, in flowchart form, a method 600 of regulating electrode position. The method 600 begins in step 602, when the electrode position controller 148 receives a feed request signal from the feed rate controller 172 indicating that new material is to be input to the furnace 101. The feed request signal may result from a manual operator-initiated feed instruction, or may result from an automated feed instruction in the case of an automated feed control and electrode positioning system such as is commercially available from Hatch Limited in Ontario, Canada. The Minstral™ furnace control system, commercially available from Mintek in Randburg, South Africa, may also be used as a suitable electrode positioning system. Once the electrode position controller 148 receives the feed request signal it overrides the electrode impedance setting in step 604 and initiates lowering of the electrode(s) 112 in step 606.

While the electrode(s) 112 is being lowered, in step 608 the reactor controller 128 maintains the power and/or current set-point through adjustments to the variable reactor 118. In step 610, the electrode position controller 148 determines whether or not the electrode 112 has reached the desired position. It may make this decision on the basis of electrode impedance and/or calculated arc length reaching a threshold value. The threshold value may correspond to a height wherein the electrode 112 is in direct contact with the slag bath, thereby minimizing the possibility that new material could break the arc path. It would typically take a few seconds for the electrode 112 to be lowered to such a level.

Once the electrode 112 has reached the desired height, then in step 612 the electrode position controller 148 sends an enable signal to the feed rate controller 172 to indicate that the feed rate controller 172 may now initiate the introduction of new feed material to the furnace. Accordingly, in step 614, the feed system 170 begins to introduce new material to the furnace 101.

The feed system 170 sends the electrode position controller a completion signal (not shown), such as a feed end signal, in step 616 to indicate the end of the feed process. In response to the feed end signal, in step 618 the electrode position controller begins to withdraw or raise the electrode. While the height of the electrode 112 is being altered, the reactor controller 128 adjusts the value of the variable reactor 118 to maintain a power and/or current set-point in step 620. In step 622, the electrode position controller 148 determines whether or not the electrode 112 has reached the desired height. This determination may be based upon the electrode impedance, which may be compared with the electrode impedance set-point that was temporarily overridden in step 604, or upon the output of a dedicated sensor or physical measuring device. Once the electrode impedance (or arc length or other measure) reaches the appropriate set-point, then in step 624, the electrode position controller 148 holds the electrode position and returns to normal operation.

In a multi-phase, multiple electrode arc furnace, the position of each electrode on each phase may be controlled independently of each other electrode. Accordingly, an electrode positioning system (not shown), including an electrode position controller 148, may determine the appropriate electrode position of each electrode, depending on a number of factors. Such factors may include, for example, the feed rate of the new material being supplied to the furnace, the locations at which the feed material is entering the furnace, any wear at the electrode tip, the kind of feed material being fed into the furnace, the apparent height of the slag bath and other operating or environmental conditions.

Assuming each electrode is normally controlled by the electrode position controller to meet an impedance, power and/or current set-point, this control may need to be overridden by the electrode positioning system in response to receipt of the feed request signal, so that the electrode can be lowered. Accordingly, the electrode positioning system may have an override component, such as a programmable override function provided in software resident on the electrode positioning system.

It should be understood that this embodiment may be applied to non-arcing (immersed) electrodes, as well as arcing electrodes. For furnaces employing immersed electrodes, the introduction of the feed material can cause a slag surface disturbance. By lowering the electrode tip of an immersed electrode in anticipation of entry of the feed material, the electrode tip is kept more distant from the surface, where the disturbance is occurring, thereby reducing the likelihood of loss of conduction due to the disturbance. This would be advantageous for electrodes at about 10% immersion, for example.

In certain embodiments, fluctuations in the arc impedance may be compensated through adjustment of the variable reactor 118, adjustment of the electrode position, or both. It will also be appreciated that the adjustment of the electrode position is a corrective action that typically requires more time than the adjustment of the variable reactor 118, which can occur with each half cycle of the supply voltage.

Accordingly, the variable reactance control system (i.e. variable reactor 118 in combination with reactor controller 128) may respond more quickly to variations in arc impedance than the electrode positioning system, allowing the electrode positioning system time to react to the variations.

The methods and systems described herein may be implemented using variable reactance control systems, electrode positioning systems, or both, for the purpose of reacting to power and/or current fluctuations and/or controlling unbalances. Although the following embodiments refer to use of a variable reactance control system for power and/or current stabilization or unbalance compensation, the present invention is not limited to use of a variable reactance control system. Other embodiments may employ an electrode positioning system alone or in combination with a variable reactance control system.

Referring again to FIG. 3, the power control system 100 further includes a central controller 200. The central controller 200 is coupled to each furnace (or phase) to receive measurement data regarding the operating characteristics of each furnace. For example, in one embodiment, the central controller 200 is coupled to each reactor controller 128, and in particular to each current transformer 134 to receive current measurements for each furnace.

The central controller 200 includes further inputs coupled to each reactor controller 128 or specifically to each first voltage transformer 130 to receive a measurement of the voltage on the supply side of the variable reactor 118 for each furnace. In other words, the central controller 200 receives voltage and current measurements for each furnace (or phase). The central controller 200 may receive the voltage and current measurements through direct coupling with dedicated additional current and voltage transformers, the current and voltage transformers 134, 130 used in the variable reactance control circuit, or indirectly from one or more output ports of the reactor controller 128. It will be appreciated that there may be other arrangements by which the central controller 200 is provided with voltage and/or current measurements for each of the furnaces (or phases).

The operating characteristics monitored by the central controller 200 includes the setting or value of each variable reactor 118. This variable reactor setting is input to the central controller 200 from each reactor controller 128. For example, each reactor controller 128 outputs its calculated reactance setting to the central controller 200.

The central controller 200 further includes an input for receiving a total power set-point value 208. The total power set-point value 208 is calculated from the sum of the individual desired power set-point inputs 136 for each furnace. Preferably, the central controller 200 receives the individual power set-point values 136 from each of the reactor controllers 128 and calculates the total power set-point value 208 by summing the received values.

The central controller 200 may comprise a digital signal processor, a microprocessor, microcontroller, or other programmable device for executing a program stored in memory, e.g. firmware, to implement the functions described herein. It will be appreciated that the functions of the central controller 200 may be implemented using a number of different hardware and/or software configurations. The suitable programming of the central controller 200 will be within the knowledge of those of ordinary skill in the art having regard to the present description.

The central controller 200 regulates the overall operation of all of the furnaces (and power on each phase for each multi-phase furnace) in accordance with one or more of the conditions described above. Accordingly, the central controller 200 includes a first output port 202 coupled to each reactor controller 128. The central controller 200 outputs a first control signal through the first output port 202 thereby providing instructions to the reactor controller 128 for adjusting the variable reactor 118. In one embodiment, the central controller 200 also includes a second output port 204 coupled to the electrode position controller 148. The central controller 200 outputs a second control signal through the second output port 204, thereby providing instructions to the electrode position controller 148 for adjusting the electrode height. The first and second control signals may comprise a value calculated by the central controller 200 to satisfy one or more of the conditions. The value calculated by the central controller 200 will override the value calculated by the reactor controller 128 for governing its control of the corresponding variable reactor 118.

In one embodiment, the central controller 200 stabilizes the power consumption of multiple three-phase loads, so as to satisfy the first and/or third condition described above. The first condition (exemplified by Equation 1) requires that the sum of the power drawn by each electrode of a furnace should equal a power set-point value for that furnace. The third condition (exemplified by Equation 3) requires that the sum of the individual power consumption by all furnaces should equal the total power set-point value for the whole system. The central controller 200 monitors the operating characteristics for each of the furnaces (or phases) and identifies whether a furnace (or phase) has been unable to compensate for a drop in power on an individual basis. For example, three-phase furnace A may experience a drop in three-phase power and may attempt to compensate using the variable reactors 118. The central controller 200 monitors the currents and the voltages $V_{lineA}$ and the setting of the variable reactors 118, for a given in furnace A. If the setting of the variable reactors 118 reach a minimum or a maximum value, and the power drawn by furnace A deviates from the furnace A power set-point $P_{spA}$ by more than a predetermined amount P, then the central controller 200 will act to compensate for the deviation. The central controller 200 calculates the extent to which the power drawn by furnace A falls short of (or becomes higher than) the desired power set-point $P_{spA}$, and instructs the remaining furnaces to increase or decrease their power draw by a certain amount to compensate for the power deviation in furnace A.

Similarly, for example, within a single three-phase furnace one phase may experience a drop or rise in power and the central controller 200 may attempt to compensate using the variable reactor 118 associated with that phase. If the variable reactor controller 128 for that phase is unable to compensate because the setting of variable reactor 118 reaches a maximum or minimum value and the power has not returned to its set-point, then the central controller 200 determines that the variable reactor controller 128 for that phase is unable to address the power change alone. Accordingly, the central controller 200 may determine the amount by which the remaining phases must increase or decrease their power draw to compensate for the shortfall or rise on one phase. It then issues control signals to instruct the variable reactor controllers 128 on the other phases to adjust their power consumption through adjusting their power set-point, and thus the value of their variable reactor 118.

Figure 7:
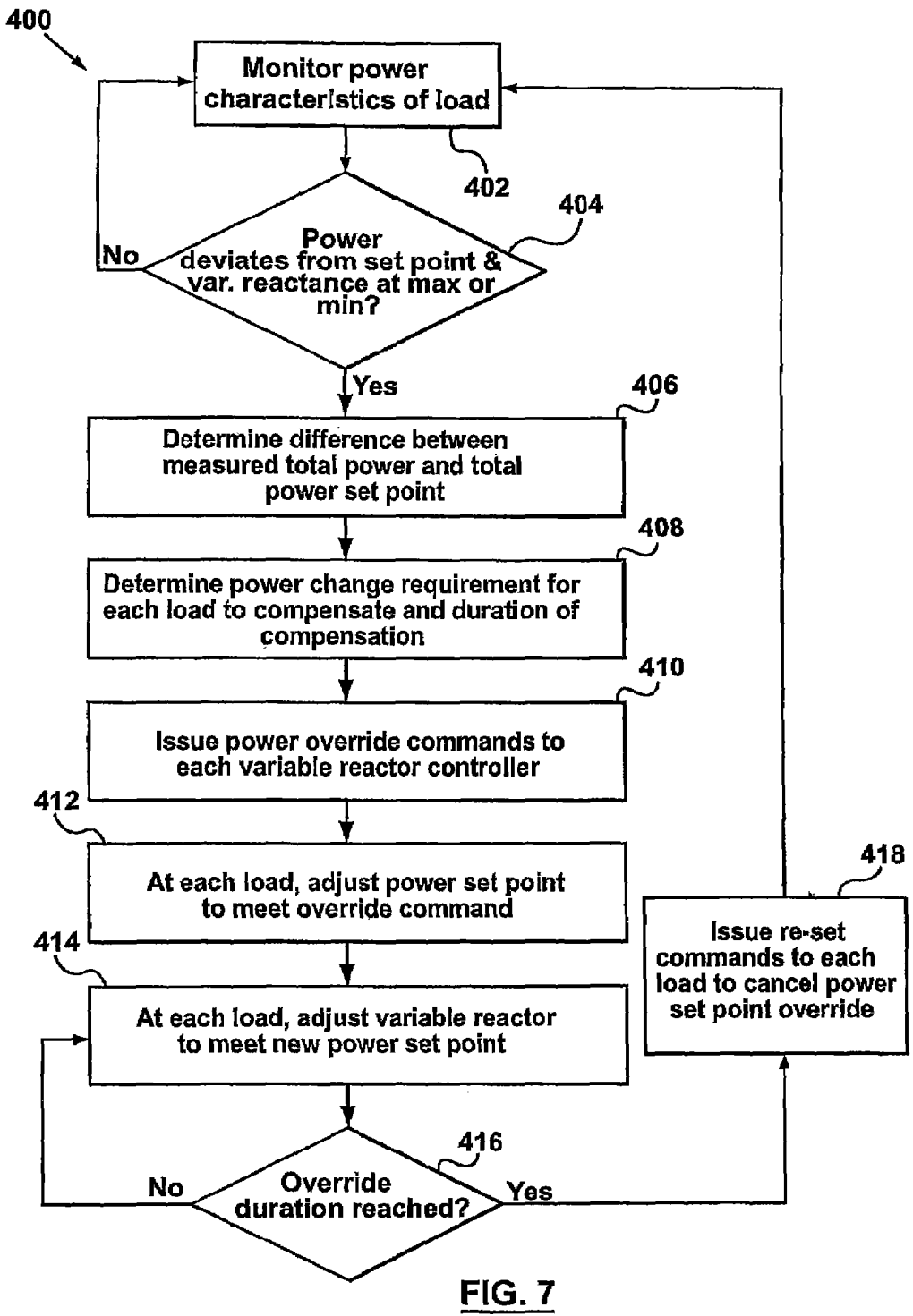
FIG. 7 shows, in flowchart form, a method of stabilizing the power drawn by multiple loads.

Referring also to FIG. 7, there is shown a flowchart of a method 400 of stabilizing the power consumption of at least two loads. The method 400 begins in step 402, wherein the central controller 200 monitors the operating characteristics of the electrical loads in the furnaces. In particular, the central controller 200 monitors whether or not the load is operating at the preset power set-point. It also monitors whether or not the value or setting of the variable reactor of each load has reached a maximum or minimum setting. In step 404, the central controller determines whether or not corrective action is required by assessing whether the power drawn by a load has deviated from a set-point. It also assesses whether the variable reactor associated with the load (or in the case of a three phase load, any one of the three variable reactors) has reached a maximum or minimum value. If these two conditions have occurred, then the central controller recognizes that compensation is required to stabilize the power consumption and the method continues to step 406. If these conditions do not exist, i.e. if the power drawn does not deviate from the set-point or the associated variable reactor has not reached a maximum or minimum value, then the method returns to step 402 to continue monitoring the situation.

It will be appreciated that the loads may be per phase loads within an individual three-phase furnace, or may be three-phase loads associated with multiple furnaces. It will also be understood that in the latter case the central controller may receive individual inputs for each phase within each furnace and may monitor variable reactors of each phase within each furnace.

In step 406, the central controller determines the extent to which it must take corrective action to maintain an overall total power set-point. It calculates the difference between the measured power drawn and the overall total power set-point. For example, if one of the loads has a power set-point of 70 MW and has dropped to an actual power draw of 50 MW, and two other loads are drawing power at the power set-point of 70 MW, then there is a 20 MW shortfall.

In step 408, the central controller determines the power change required within the other furnaces (other than the furnace experiencing difficulty) to compensate for the calculated difference. The central controller may employ a number of rules or algorithms to determine the extent to which other loads should compensate for a power shortfall. In some embodiments, the additional power draw required may be apportioned equally between the other furnaces. In other embodiments, more complicated rules may apply for determining the relative apportionment of the additional power draw required. In one embodiment, the central controller may include a memory storing a look-up table. The look-up table may specify, for particular power shortfalls associated with particular loads, the corresponding power increases that the other loads are to implement. The central controller may further apply interpolation for values that fall between two entries in the look-up table. The look-up table values may be partly based upon the thermal short term capability curve of the power supply and the process for the particular furnace operating point.

Once the central controller has determined the relative power increases required from the other loads to compensate for the power shortfall, then in step 410 it issues power override commands to the variable reactor controllers associated with the other loads. It may, for example, send a control signal specifying a new load-specific power set-point. Alternatively, it may send a control signal specifying an increment by which the existing load-specific power set-point should be increased. The power override command may also include an override duration. The override duration may be a predetermined value stored at the central controller. The override duration may be dependent upon the situation and may be specified by the look-up table.

Each of the variable reactor controllers associated with the other loads receives its power override command in step 412 and adjusts its load-specific power set-point accordingly. In step 414, the variable reactor controllers react to the adjusted load-specific power set-point by determining a new value for their associated variable reactor. Accordingly, the values of the variable reactors are changed and the power drawn by each of the other loads is varied to meet the adjusted load-specific power set-points. The variable reactor controllers maintain these adjusted load-specific power set-points until the override duration expires. In step 416, the variable reactor controllers determine whether or not the override duration has expired. If so, then in step 418 they re-set their load-specific power set-points to remove the override component and return to normal operation. The method 400 then returns to step 402, wherein the central controller continues its monitoring function.

In an alternative embodiment, at step 418 the central controller reassesses the power consumption of the loads and determines whether or not the problematic load has returned to normal operation, e.g. whether or not the power deficiency problem has been resolved. If so, then it cancels the override commands and returns to step 402. If not, then it may either extend the override period, modify the override commands in accordance with further instructions in the look-up table, or cancel the override and alert an operator to the problem.

In another alternative embodiment, the control system does not feature individual variable reactance control systems associated with each variable reactor. Rather, the central control system directly controls each variable reactor. For example, a three-phase load may have a variable reactor for each phase and the control system may provide a central controller coupled to each variable reactor for monitoring operating characteristics of each phase and managing corresponding adjustments to each variable reactor. Such an embodiment may be implemented as a Y-configuration three-phase load, i.e. a load supplied with via a 3-wire system with no neutral wire connection. Different set-points may apply to each phase of the three-phase load, resulting in a predetermined level of unbalance. The interrelationship of the three loads leads to a system of equations that the central controller solves in order to determine adjustments necessary to all three variable reactors in order to address deviations from one or more of the set-points. Changes in one variable reactor affect the operating characteristics of all of the phases. To adjust the characteristics of a phase so as to address deviation from a set-point, adjustments are made to all of the variable reactors. The adjustment to each variable reactor is determined taking into account the characteristics of all phases.

In addition to, or as an alternative to, implementing a power stabilization function, the central controller may implement an unbalance compensation function. The second condition set out above (Equation 2) states that the unbalance within a three-phase load should be minimized. The fourth condition (Equation 4) states that the overall unbalance within a multiple three-phase load system should be minimized.

Referring again to FIG. 3, the central controller 200 monitors the extent of unbalance within one or more three-phase loads. In the case of a single furnace having a three-phase load, the central controller 200 determines the extent of unbalance within the three-phase load and provides corrective instructions to the variable reactor controllers 128 to minimize the unbalance. In the case of multiple furnaces each having three-phase loads, the central controller 200 determines whether the overall combination of the furnaces exhibits unbalance. It may assess whether the overall unbalance is due to a significant unbalance within one of the furnaces and whether that furnace is unable to compensate. It then provides corrective instructions to the remaining furnaces.

For example, in the case of a single furnace the central controller 200 monitors the current in each phase and determines the negative sequence current $I_2$ for the furnace in accordance with Equation 5. If the calculation of negative sequence current $I_2$ indicates that the furnace is unbalanced, then the central controller 200 may determine corrective action to minimize the unbalance. For example, it may conclude that the unbalance results from a low current measurement in one of the phases and it may correct the unbalance by lowering the current in the other two phases. It will be understood that this would result in reduced power draw and would need to be evaluated against the goal of maintaining a power set-point. The central controller 200 may include a memory storing logic rules or a look-up table for resolving the appropriate corrective action for a given situation.

To compensate for an unbalance situation, the central controller 200 outputs command signals to the variable reactor controllers 128 and in response the variable reactor controllers 128 adjust their associated variable reactors 118. As described above, in one embodiment the command signals may comprise an override power set-point to be used in place of the normal power set-point for the load. In another embodiment, the command signal may comprise an incremental power set-point increase or decrease. It will be appreciated that other command signals may be used, including specifying a current set-point or a variable reactor value or setting.

In the case of multiple furnaces, the central controller 200 may monitor the overall unbalance resulting from the multiple three-phase loads and the setting of the variable reactors 118 for each three-phase load. The central controller 200 may also or alternatively monitor for significant unbalance in any one of the multiple three-phase loads. If an unbalance condition exists and one or more variable reactors 118 are at their minimum or maximum settings then corrective action by the central controller 200 may be required.

Those of ordinary skill in the art will recognize that in the case of multiple furnaces, each furnace may have its own 'central' or 'intermediate' level controller coupled to the three variable reactor controllers 128 associated with the three phase load. The central controller 200 may then communicate directly with the intermediate controllers. In other words, there may be a "nesting" of controllers. The central controller 200 may also, or alternatively, communicate directly with the variable reactor controllers 128 for each phase. To monitor the unbalance of each load the central controller 200 may receive current measurements directly through the current transformers 134. In another embodiment, the central controller 200 obtains current measurements from the per-phase variable reactor controllers 128. In yet another embodiment, the central controller 200 obtains current measurements from the intermediate controller for each furnace. In other embodiments, the central controller 200 may receive the calculated unbalance condition of each three-phase furnace from its associated intermediate controller.

In any event, the central controller 200 monitors overall unbalance and/or the unbalance of individual furnaces, and monitors whether a variable reactor associated with one of the furnaces experiencing unbalance is at the end of its range of settings or values. This indicates that the furnace is unable to compensate for the unbalance situation alone. Accordingly, the central controller 200 attempts to compensate for the unbalance of one furnace by introducing offsetting unbalance in the other furnaces.

The central controller 200 determines the amount negative sequence current $I_2$ required to offset the negative sequence current $I_2$ associated with the unbalanced furnace. As explained above in connection with power stabilization, the central controller 200 may utilize logic rules or algorithms to calculate the appropriate changes required from the remaining furnaces to generate the offsetting negative sequence current $I_2$. The central controller 200 may consult a lookup table stored in memory at the central controller 200 to determine the appropriate corrective action. The corrective action may include instructing the other furnaces to increase or decrease power or current on one or more phases. The command signal issued by the central controller 200 to the intermediate controller or to the variable reactor controllers 128 may include override power or current set-points for particular phases, and may include an override duration. In an embodiment wherein the central controller 200 sends its command signal to an intermediate controller and the command signal specifies a particular negative sequence current $I_2$ required from the furnace, then the intermediate controller may store a look-up table setting out the variable reactance values associated with particular negative sequence currents $I_2$, power drawn, and arc impedances. Interpolation may be used to determine values between entries in the table. The intermediate controller may then issue control signals to the per-phase variable reactor controllers 128 specifying the setting of their associated variable reactances 118.

Figure 8:
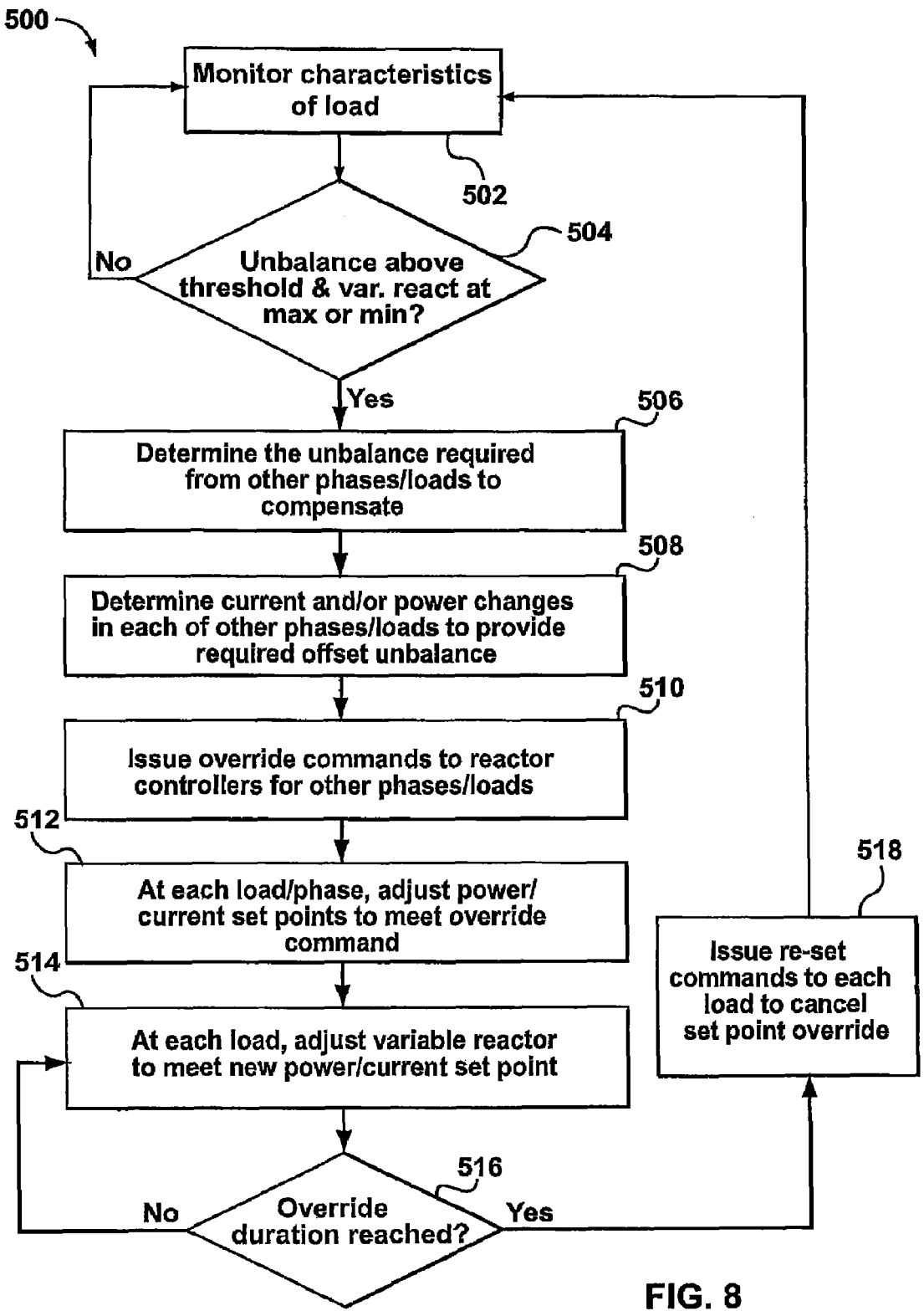
FIG. 8 shows, in flowchart form, a method of compensating for unbalance in multi-phase loads.

Reference is now made to FIG. 8, which shows a method 500 of compensating for unbalance in one or more multi-phase loads.

The method 500 begins in step 502, wherein the central controller monitors operating characteristics of the one or more loads/phases. In particular, the central controller monitors whether or not the loads/phases are unbalanced beyond a threshold. The threshold may be set to zero, meaning any unbalance will be noted, but in practice the threshold may be set so as to allow for a small amount of unbalance without triggering compensation. For example, the threshold may be set to about 10%. The central controller may also monitor whether or not the value or setting of the variable reactor of any phase in the one or more loads has reached a maximum or minimum setting.

In step 504, the central controller determines whether or not corrective action is required by assessing whether the unbalance in the one or more loads exceeds a threshold. It may further identify the particular load that has caused the overall unbalance—i.e. the unbalanced load. It also assesses whether a variable reactor associated with the unbalanced load has reached a maximum or minimum value. If these conditions have occurred, then the central controller recognizes that compensation is required to re-balance the power consumption and the method continues to step 506. If these conditions do not exist, i.e. if the overall system is balanced or if the associated variable reactor has not reached a maximum or minimum value, then the method returns to step 502 to continue monitoring the situation.

In step 506, the central controller determines the extent to which it must take corrective action to compensate for the detected unbalance. In a single multi-phase load embodiment, it determines the magnitude of the unbalance on one phase and determines the adjustments that must be made to the other phases to compensate and balance the system. In a multi-furnace embodiment, it determines the negative sequence current $I_2$ for the unbalanced furnace so as to identify the extent to which offsetting negative sequence current is required from the other loads so as to balance the overall system.

In step 508, the central controller determines the current and/or power changes required within the other furnaces (other than the furnace experiencing difficulty) to compensate for the unbalance. For example, and as described by way of example below in connection with FIGS. 4 to 6, in a multi-load scenario the central controller may determine the negative sequence currents necessary on each phase to cancel the negative sequence currents attributable to the unbalanced load. The central controller may then allocate the required per-phase negative sequence currents to each of the loads and calculate the per-phase adjustments required at each load to introduce sufficient unbalance to produce the negative sequence current.

The central controller may employ a number of rules or algorithms to determine how other loads can compensate for unbalance. In some embodiments, the required unbalance may be apportioned equally between the other furnaces. In other embodiments, more complicated rules may apply for determining the relative apportionment of the unbalance required. In one embodiment, the central controller may include a memory storing a look-up table. The look-up table may specify, for particular unbalance conditions the corresponding power and/or current adjustments on each phase of the other loads to counteract the unbalance. The central controller may further apply interpolation for values that fall between two entries in the look-up table.

Once the central controller has determined the relative power and/or adjustments required from each phase in the other loads to compensate for the unbalance, then in step 510 it issues override commands to the variable reactor controllers associated with the other phases/loads. It may, for example, send a control signal specifying a new load-specific power or current set-point. Alternatively, it may send a control signal specifying an increment by which the existing load-specific power or current set-point should be increased. The override command may also include an override duration. The override duration may be a predetermined value stored at the central controller. The override duration may be dependent upon the situation and may be specified by the look-up table.

Each of the variable reactor controllers associated with each phase on the other loads receives its override command in step 512 and adjusts its operation accordingly. This may, for example, include adjusting a load-specific (or phase-specific) power or current set-point. In step 514, the variable reactor controllers adjust their associated variable reactor to comply with the override settings specified by the override command. Accordingly, the values of the variable reactors are changed and the power and/or current drawn by each of the other phases/loads is varied. The variable reactor controllers maintain the adjusted load-specific power and/or current set-points until the override duration expires. In step 516, the variable reactor controllers determine whether or not the override duration has expired. If so, then in step 518 they re-set their load-specific power and/or current set-points to remove the override component and return to normal operation. The method 500 then returns to step 502, wherein the central controller continues its monitoring function.

In an alternative embodiment, at step 518 the central controller reassesses the unbalance of the loads and determines whether or not the problematic load has returned to normal operation, e.g. whether or not the unbalance problem has been resolved. If so, then it cancels the override commands and returns to step 502. If not, then it may either extend the override period, modify the override commands in accordance with further instructions in the look-up table, or cancel the override and alert an operator to the problem.

Figure 4:
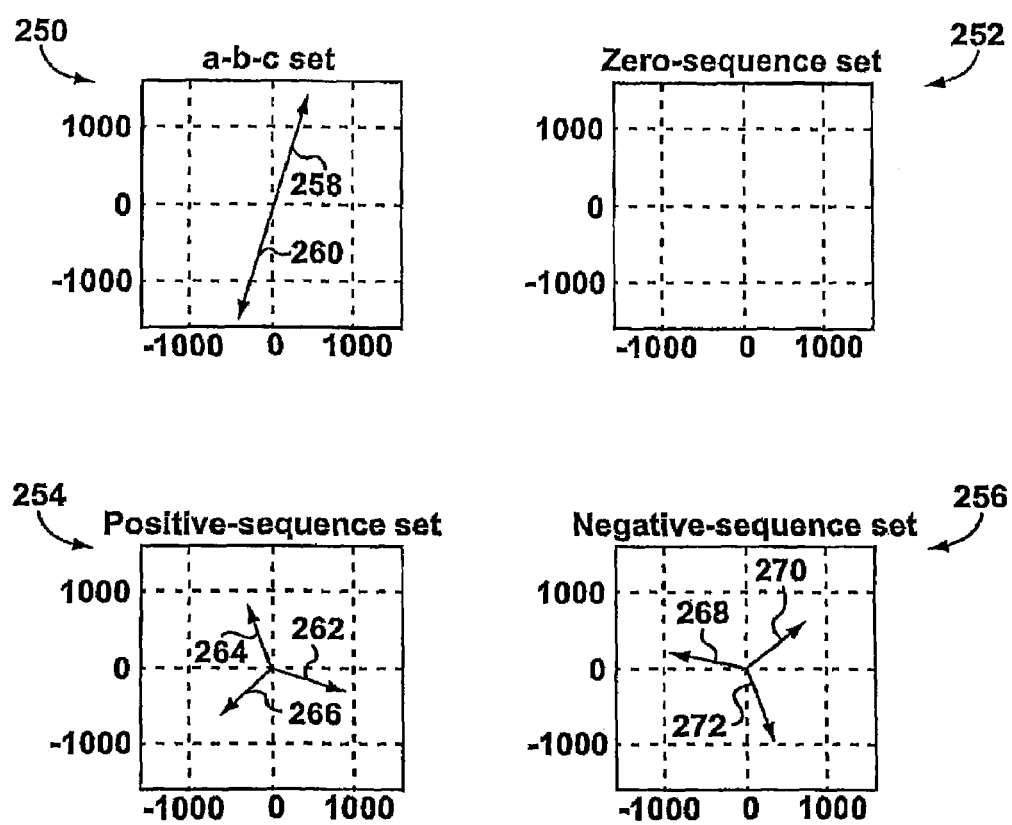
FIG. 4 graphically shows an example of phasor diagrams of a first furnace under a loss of arc condition.
Figure 5:
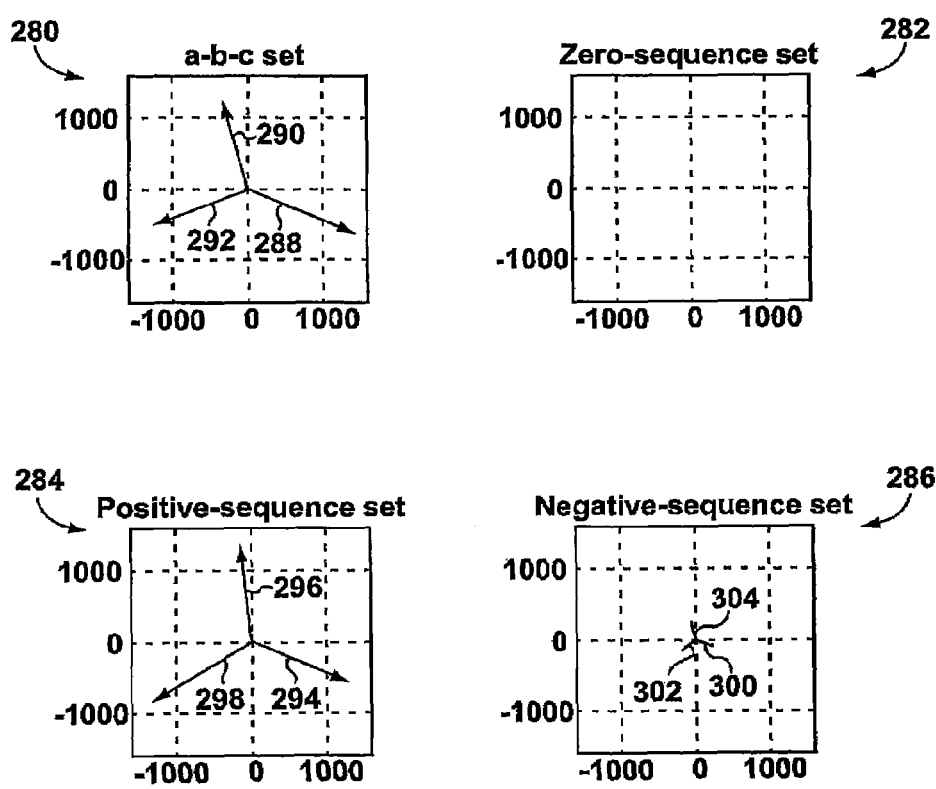
FIG. 5 graphically shows an example of phasor diagrams of other furnaces compensating for the loss of arc condition shown in FIG. 4.
Figure 6:
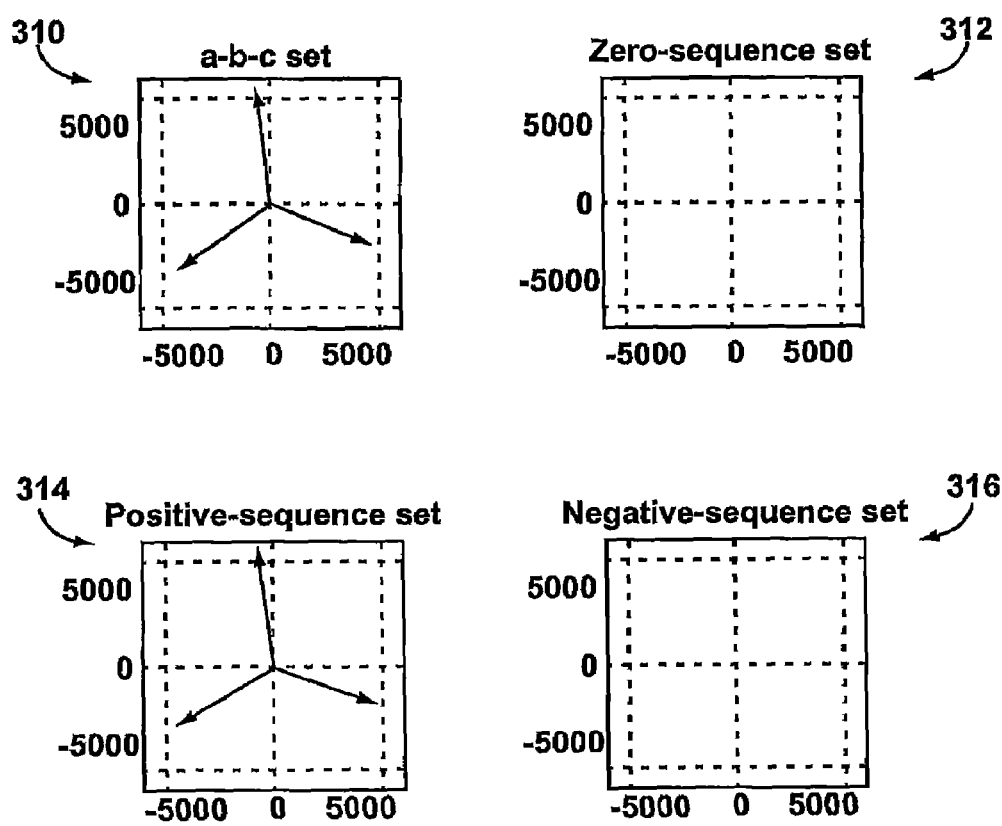
FIG. 6 graphically shows an example of phasor diagrams of the total power draw of the furnaces represented in FIGS. 4 and 5.

Reference is now made to FIGS. 4, 5, and 6 which graphically show phasor diagrams for an example embodiment according to the present invention. In the example embodiment, the power control system 100 (FIG. 3) includes four three-phase loads: Furnaces F1, F2, F3, and F4. The arc on phase A of Furnace F1 has been extinguished.

FIG. 4, shows four phasor diagrams 250, 252, 254, 256 based on the current drawn by Furnace F1. The first phasor diagram 250 shows the a-b-c current components of the three phases of the three-phase load, where one of the phases has dropped out. In particular, the first phasor diagram 250 shows a phase B current component 258 and a phase C current component 260. No phase A current component is visible due to the loss of arc on phase A.

Those of ordinary skill in the art will appreciate that a set of three-phase vectors may be decomposed into three sets of balanced vectors: the positive-sequence set, the zero-sequence set and the negative-sequence set. All of the phasors within the positive-sequence set have the same magnitude, as do all of the phasors within the negative-sequence set and the zero-sequence set. A perfectly balanced system will have a positive-sequence set that matches the a-b-c current phasor diagram. An unbalanced system will have a negative-sequence set and/or a zero sequence set with non-zero magnitude phasors. For a three-wire system such as the one in the example, no zero-sequence current may flow, so the zero-sequence set for all conditions may be have zero magnitude.

In FIG. 4, the third phasor diagram 254 shows the positive-sequence set of phasors for the case where the arc on phase A has been lost. The fourth phasor diagram 256 shows the negative-sequence set. The positive-sequence set includes positive-sequence phasors for phase A 262, phase B 264, and phase C 266. Similarly, the negative-sequence set includes negative-sequence phasors for phase A 268, phase B 270, and phase C 272. It will be noted that summing the third phasor diagram 254 and the fourth phasor diagram 256 will result in the first phasor diagram 250, since the positive-sequence phasor for phase A 262 will cancel the negative-sequence phasor for phase A 268.

The power control system 100 recognizes that the power has dropped in Furnace F1 and that the reactor controller 128 (FIG. 3) for Furnace F1 has been unable to correct for the drop in power and the unbalance condition. The overall power drawn by the four furnaces drops by the amount that Furnace F1 falls short of its power set-point and the unbalance condition in Furnace F1 causes an overall unbalance condition in the power drawn by the four furnaces. Accordingly, the power control system 100 instructs the reactor controllers 128 for Furnaces F2, F3, and F4 to adjust the variable reactors 118 (FIG. 3) for Furnaces F2, F3, and F4, to increase the power drawn by those furnaces and introduce a measure of phase unbalance to counteract the unbalance caused by Furnace F1.

FIG. 5 shows four phasor diagrams 280, 282, 284, 286, based upon the current in Furnaces F2, F3 and F4, after the reactor controllers 128 adjust the variable reactors 118. The first phase diagram 280 shows current phasors for phase A 288, phase B 290, and phase C 292. The phasors 288, 290, 292 have different magnitudes and are not 120 degrees out of phase from each other—i.e. they are not balanced.

The third phasor diagram 284 shows the positive-sequence phasors for phase A 294, phase B 296, and phase C, and the fourth phasor diagram 286 shows the negative-sequence phasors for phase A 300, phase B 302, and phase C 304. The magnitude of the negative-sequence phasors 300, 302, 304 in the fourth phasor diagram 286 are indicative of the amount of unbalance introduced to each of the Furnaces F2, F3, and F4 through adjustment of their variable reactors 118.

FIG. 6 shows four phasor diagrams 310, 312, 314, 316 for the overall sum of currents drawn by all four Furnaces F1, F2, F3, and F4. It will be appreciated that the sum of currents is balanced, as indicated by the absence of any negative-sequence phasors in the fourth phasor diagram 316 and by the match between the first phasor diagram 310 and the third phasor diagram 314.

The following two tables further illustrate the above-described example. The first table, Table 1, shows the values of certain variables in the case where there is no power stabilization system. The second table, Table 2, shows the values of those variables after adjustments by the power control system 100 (FIG. 3).

TABLE 1 no power stabilization or unbalance compensation

|  | $X_{varA}$ Ohms | $X_{varB}$ Ohms | $X_{varC}$ Ohms | $P_{sp}$ MW | P MW | $I_A$ A | $I_B$ A | $I_C$ A | $I_1$ A | $I_2$ A | $I_2/I_1$ % |
|---|---|---|---|---|---|---|---|---|---|---|---|
| F1 | 3.9 | 3.9 | 3.9 | 70 | 35 | 0 | 1262 | 1262 | 729 | 729 | 100.0 |
| F2 | 3.9 | 3.9 | 3.9 | 70 | 70 | 1458 | 1458 | 1458 | 1458 | 0 | 0.0 |
| F3 | 3.9 | 3.9 | 3.9 | 70 | 70 | 1458 | 1458 | 1458 | 1458 | 0 | 0.0 |
| F4 | 3.9 | 3.9 | 3.9 | 70 | 70 | 1458 | 1458 | 1458 | 1458 | 0 | 0.0 |
| Total |  |  |  | 280 | 245 |  |  |  | 5103 | 729 | 14.29 |

TABLE 2 power stabilization and unbalance compensation

| | $X_{varA}$ Ohms | $X_{varB}$ Ohms | $X_{varC}$ Ohms | $P_{sp}$ MW | P MW | $I_A$ A | $I_B$ A | $I_C$ A | $I_1$ A | $I_2$ A | $I_2/I_1$ % |
|---|---|---|---|---|---|---|---|---|---|---|---|
| F1 | 0 | 0 | 0 | 70 | 46 | 0 | 1443 | 1443 | 833 | 833 | 100.0 |
| F2 | 0 | 6.8 | 0.5 | 70 | 78 | 1783 | 1431 | 1373 | 1516 | 269 | 17.74 |
| F3 | 0 | 6.8 | 0.5 | 70 | 78 | 1783 | 1431 | 1373 | 1516 | 269 | 17.74 |
| F4 | 0 | 6.8 | 0.5 | 70 | 78 | 1783 | 1431 | 1373 | 1516 | 269 | 17.74 |
| Total | | | | 280 | 280 | | | | 5371 | 49 | 0.91 |

It will be noted that the current on phase A of furnace F1 is zero in both cases and that the first furnace, F1, is 100% unbalanced. In both cases, the desired power set-point for each furnace is 70 MW with an overall total power-set-point of 280 MW. In the case where there is no power stabilization, the three other furnaces F2, F3, and F4 are fully balanced and operate at the power set-point of 70 MW. The overall result for the system in this case is a power drop of about 35 MW and an unbalance of over 14%. Furnace power supply systems can normally tolerate an unbalance of up to 10% for limited periods of time, but a prolonged greater degree of unbalance may result in overheating and possibly shutdown of the generator.

In the second case, where the power control system 100 has caused variable reactances and/or electrode position adjustments to be made to the variable reactances 118 (FIG. 3) in Furnaces F2, F3, and F4, the overall power draw of the four furnaces is maintained at the total power set-point of 280 MW by increasing the power drawn by furnaces F2, F3, and F4. It will be apparent from Table 2 that adjustments have been made to the variable reactors 118 in furnaces F2, F3, and F4 so as to adjust the current drawn by each phase of those furnaces, thereby increasing the power consumed and increasing the unbalance in each furnace. The unbalance introduced to furnaces F2, F3, and F4 is approximately 17.74%, although the effect is to reduce the overall phase unbalance seen by the power generator to less than 1%.

Although the variable reactor 118 has been shown as including a single pair of thyristor switches, it will be appreciated that other configurations could be used for variable reactor 118, such as a multi-stage thyristor switch for example. Alternatively, other types of power switches could be used in the place of thyristors.

The present invention may be embodied in other specific forms without departing from the spirit or essential characteristics thereof. Certain adaptations and modifications of the invention may be apparent to those skilled in the art. Therefore, the above discussed embodiments are considered to be illustrative and not restrictive, the scope of the invention being indicated by the appended claims rather than the foregoing description, and all changes which come within the meaning and range of equivalency of the claims are intended to be embraced therein.

The invention claimed is:

1. An electric furnace coupled to a power supply, comprising:
   at least one electrode;
   a variable reactor control system for maintaining a set-point, including a variable reactor coupled between each at least one electrode and the power supply;
   a feed control system for controlling the input of feed materials to the furnace, the feed control system having an output for a feed request signal; and
   an electrode positioning system coupled to the at least one electrode for controlling the position of the at least one electrode, the electrode positioning system having an input for receiving the feed request signal and having positioning means for lowering the at least one electrode in response to the feed request signal.

2. The electric furnace system of claim 1, wherein the positioning means comprises an override component that outputs an enable signal when the at least one electrode is lowered to a desired height, the feed control system receiving the enable signal and initiating input of material in response to the enable signal.

3. The electric furnace system of claim 2, wherein the desired height corresponds to a predetermined electrode impedance, and wherein the override component measures an impedance of the electrode and outputs the enable signal when the measured impedance reaches the predetermined electrode impedance.

4. The electric furnace system of claim 1, wherein the at least one electrode is lowered until the at least one electrode contacts, or is positioned adjacent, a slag bath in the furnace.

5. The electric furnace system of claim 1, wherein the variable reactor control system adjusts the variable reactor to maintain the set-point for the furnace during lowering of the at least one electrode.

6. The electric furnace system of claim 1, wherein the electrode positioning system monitors an electrode impedance and adjusts the height of the at least one electrode to maintain the electrode impedance at an impedance set-point, and wherein the positioning means overrides said impedance set-point in response to the feed request signal.

7. The electric furnace system of claim 1, wherein the feed control system is configured to output a feed end signal to the electrode positioning system after input of the feed material, and wherein the electrode positioning system raises the at least one electrode in response to the feed end signal.

8. The electric furnace system of claim 1, wherein the power supply supplies multi-phase power and the electric furnace comprises multiple electrodes, each electrode being coupled to a respective phase of the multi-phase power supply, and wherein each electrode is coupled to a respective variable reactor control system and to the electrode positioning system.

9. A method for operating an electric furnace coupled to a power supply, the furnace including at least one electrode positionable by an electrode positioning system and a feed control system for controlling the input of feed material to the furnace, the feed control system having an output for a feed request signal, the method comprising steps of:
   receiving at the electrode positioning system the feed request signal from the feed control system; and lowering the at least one electrode in response to the feed request signal.

10. The method of claim 9, further comprising the step of outputting an enable signal to the feed control system when the at least one electrode reaches a desired height, the feed control system receiving the enable signal and initiating input of feed material in response to the enable signal.

11. The method of claim 10, wherein the desired height corresponds to a predetermined electrode impedance, and wherein the step of lowering the at least one electrode includes measuring an impedance of the at least one electrode and outputting the enable signal when the measured impedance reaches the predetermined electrode impedance.

12. The method of claim 9, wherein the step of lowering is terminated when the at least one electrode contacts, or is positioned adjacent, a slag bath in the furnace.

13. The method of claim 9, wherein at least one variable reactor is coupled to a respective electrode and the power supply for maintaining a set-point, the method further comprising the step, during the step of lowering, of adjusting the at least one variable reactor to maintain the set-point for the furnace.

14. The method of claim 9, further comprising the steps of monitoring an electrode impedance and adjusting the height of the at least one electrode to maintain the electrode impedance at an impedance set-point, and wherein the step of lowering the at least one electrode includes overriding the impedance set-point in response to the feed request signal.

15. The method of claim 9, further comprising the steps of receiving a feed end signal from the feed control system and raising the at least one electrode in response to the feed end signal.

16. A system for minimizing loss of electrical conduction during input of feed material to an electric furnace, the system comprising:
  at least one electrode disposed within the furnace;
  a power supply coupled to the at least one electrode;
  a feed control system for controlling the input of feed material to the furnace, the feed control system having an output for a feed request signal; and
  an electrode positioning system coupled to each at least one electrode for controlling the position of each electrode within the furnace, the electrode positioning system having an input for receiving the feed request signal and having positioning means for causing the at least one electrode to be lowered in response to the feed request signal.

17. The system of claim 16, wherein the positioning means includes an override component that outputs an enable signal when the at least one electrode is lowered to a desired height, the feed control system receiving the enable signal and initiating input of feed material in response to the enable signal.

18. The system of claim 17, wherein the desired height corresponds to a predetermined electrode impedance, and wherein the override component measures an impedance of the at least one electrode and outputs the enable signal when the measured impedance reaches the predetermined electrode impedance.

19. The system of claim 16, wherein the at least one electrode is lowered until the electrode contacts, or is positioned adjacent, a slag bath in the furnace.

20. The system of claim 16, wherein the power supply is a multi-phase power supply.

21. The system of claim 20, wherein the system comprises a plurality of electrodes, each coupled to a respective phase of the power supply.

22. The system of claim 21, further comprising a variable reactor control system for maintaining a set-point of the furnace, including a variable reactor respectively coupled between each electrode and a respective phase of the power supply.

23. The system of claim 22, wherein the variable reactor control system adjusts one or more of the variable reactors to maintain the set-point for the furnace.

24. The system of claim 23, wherein the set-point is a power set-point.

25. The system of claim 23, wherein the set-point is a current set-point.

26. The system of claim 16, wherein the electrode positioning system monitors an electrode impedance of each electrode and adjusts the height of each electrode to maintain the electrode impedance at an impedance set-point, and wherein the positioning means overrides the impedance set-point in response to the feed request signal.

27. The system of claim 16, wherein the feed control system outputs a feed end signal, and wherein the electrode positioning system raises the at least one electrode in response to the feed end signal.

28. The system of claim 16, wherein the electric furnace is an AC arc furnace.

29. The system of claim 16, wherein the electric furnace is a DC arc furnace.

* * * * *